United States Patent
Tooman

(10) Patent No.: US 7,195,478 B1
(45) Date of Patent: Mar. 27, 2007

(54) MANIFOLD ASSEMBLY

(75) Inventor: Patrick A. Tooman, Clarkston, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 215 days.

(21) Appl. No.: 10/745,442

(22) Filed: Dec. 22, 2003

(51) Int. Cl.
B29C 45/22 (2006.01)

(52) U.S. Cl. ...................................... 425/572

(58) Field of Classification Search ................. 425/572
See application file for complete search history.

(56) References Cited

U.S. PATENT DOCUMENTS

| | | | |
|---|---|---|---|
| 4,173,448 A | 11/1979 | Rees et al. | |
| 4,810,184 A | * 3/1989 | Gellert et al. | ................ 425/572 |
| 4,964,795 A | 10/1990 | Tooman | |
| 5,378,138 A | 1/1995 | Onuma et al. | |
| 5,470,219 A | 11/1995 | Yokoyama et al. | |
| 5,783,234 A | 7/1998 | Teng | |
| 5,820,803 A | 10/1998 | Hashimoto | |
| 5,834,041 A | 11/1998 | Sekine et al. | |
| 5,840,231 A | 11/1998 | Teng | |
| 5,919,492 A | 7/1999 | Tarr et al. | |
| 6,086,357 A | 7/2000 | Steil et al. | |
| 6,099,767 A | 8/2000 | Tarr et al. | |
| 6,129,541 A | 10/2000 | Takeda | |
| 6,179,604 B1 | 1/2001 | Takeda | |
| 6,294,122 B1 | 9/2001 | Moss et al. | |
| 6,343,925 B1 | 2/2002 | Jenko | |
| 6,464,909 B1 | 10/2002 | Kazmer et al. | |
| 6,514,440 B1 | 2/2003 | Kazmer et al. | |
| 6,638,049 B1 | 10/2003 | Moss et al. | |
| 2003/0155672 A1 | 8/2003 | Kazmer et al. | |

\* cited by examiner

Primary Examiner—Tim Heitbrink
(74) Attorney, Agent, or Firm—Bliss McGlynn, P.C.

(57) ABSTRACT

A manifold assembly is provided for conveying injection molding material from a molding material supply into a mold. The manifold assembly includes a manifold having a manifold flow passage extending therealong. The manifold assembly also includes at least one nozzle extending outwardly from the manifold to a distal end. The at least one nozzle includes a central nozzle passage extending from and in fluid communication with the manifold flow passage. The at least one nozzle extends on an angle from the manifold to be tangential to an arcuate surface of a part to be molded.

18 Claims, 2 Drawing Sheets

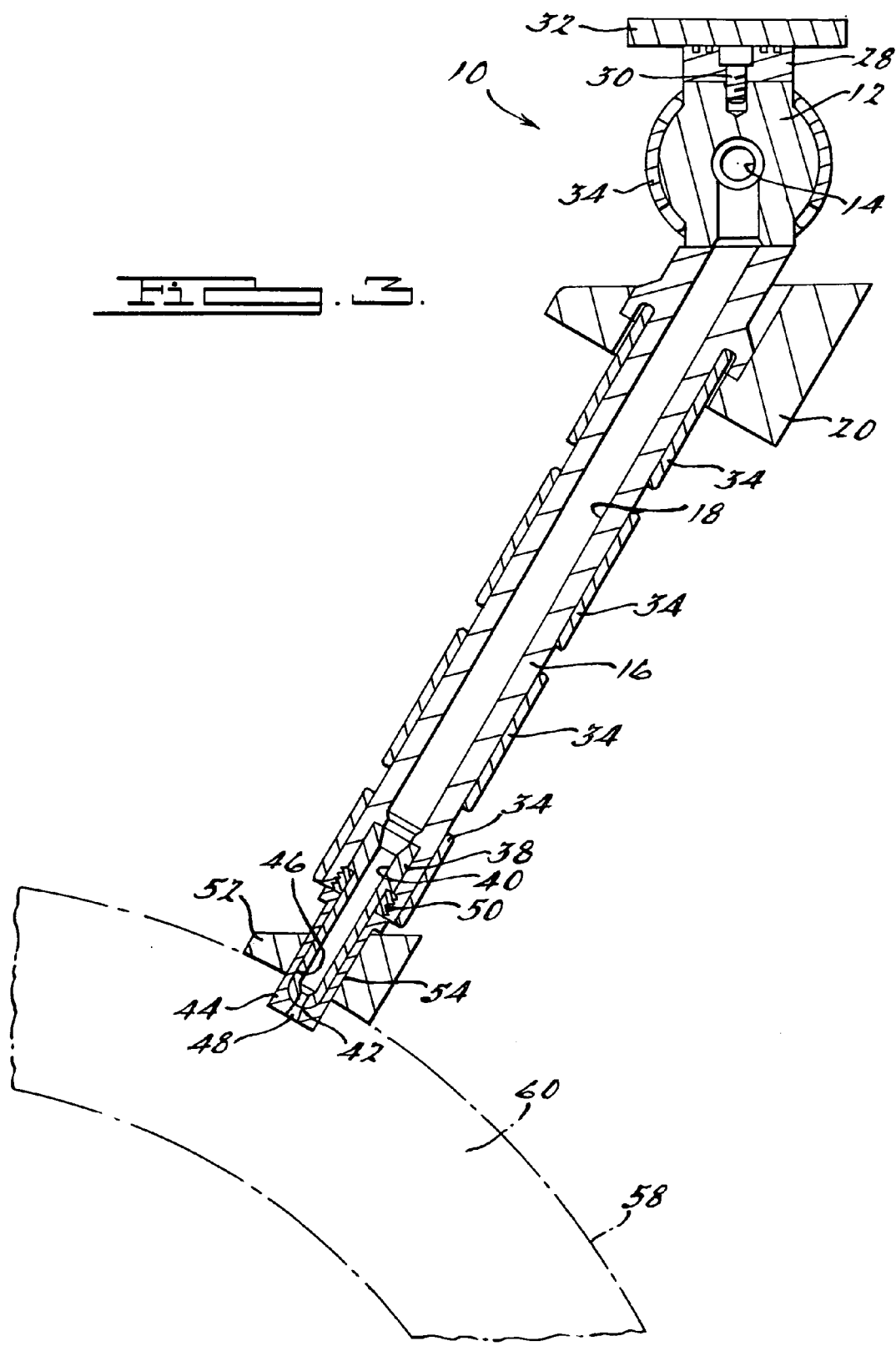

MANIFOLD ASSEMBLY

BACKGROUND OF THE INVENTION

1. Field of the Invention

The present invention relates generally to injection molding and, more particularly, to a manifold assembly for injection molding.

2. Description of the Related Art

Injection molding is a widely known manufacturing process used to produce a variety of parts. Injection molding involves introducing a molten material, for example a molten plastic or resin, into a cavity within a mold until the cavity is filled. The molten material hardens in the mold in the shape of inner surfaces of the cavity. After the molten material hardens or cures, the hardened or cured material is removed from the cavity.

For injection molding, a manifold assembly is typically used for conveying molten material from a central injection portion or sprue to a number of cavities or to multiple points within one large cavity of the mold. An example of such a manifold assembly is disclosed in U.S. Pat. No. 4,964,795 to Tooman. In that patent, a manifold assembly has an integral or one piece, cast, cylindrical manifold with a passageway and at least one nozzle extending outwardly from the manifold and having a passageway through which a molten material may pass. The terminal end of the passageway of the nozzle, called a gate, is in fluid communication with the cavity of the mold.

It is also known that the manifold assembly may be used to mold arcuate parts such as a wheel well liner for a motor vehicle. Typically, the manifold assembly has the nozzles orientated perpendicular to the manifold. As a result, a secondary operation is required or a shelf on the mold for the nozzle is required to mold an arcuate surface of the wheel well liner during the injection molding-process. In addition, a vestige is created on the molded arcuate surface due to the injection molding process, which can be up to two inches in length. As a result, secondary operation is required to remove the vestige.

Therefore, it is desirable to provide a manifold assembly that has nozzles that are tangential to an arcuate surface to be molded. It is also desirable to provide a manifold assembly for molding a wheel well liner while eliminating the need for a secondary operation for the molding process. It is further desirable to provide a manifold assembly for molding a wheel well liner that minimizes any vestige as a result of the molding process. Therefore, there is a need in the art to provide a manifold assembly that meets these desires.

SUMMARY OF THE INVENTION

Accordingly, the present invention is a manifold assembly for conveying injection molding material from a molding material supply into a mold. The manifold assembly includes a manifold having a manifold flow passage extending therealong. The machined manifold assembly also includes at least one nozzle extending outwardly from the manifold to a distal end. The at least one nozzle includes a central nozzle passage extending from and in fluid communication with the manifold flow passage. The at least one nozzle extends on an angle from the manifold to be tangential to an arcuate surface of a part to be molded.

One advantage of the present invention is that a new manifold assembly is provided having a nozzle at an angle to a manifold and tangential to an arcuate surface of a part to be molded. Another advantage of the present invention is that the manifold assembly has angled nozzles for molding a wheel well liner for a motor vehicle. Yet another advantage of the present invention is that the manifold assembly eliminates secondary operations for molding a wheel well liner by eliminating a shelf on the mold for molding the arcuate portion of the wheel well liner and the vestige associated therewith. Still another advantage of the present invention is that the manifold assembly provides precise points of injection. A further advantage of the present invention is that the manifold assembly reduces cycles times and press tonnage for molding parts with an arcuate portion. Yet a further advantage of the present invention is that the manifold assembly reduces clamp pressure for molding parts with an arcuate portion.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a fragmentary view of a portion of the manifold assembly of FIG. 2.

DESCRIPTION OF THE PREFERRED EMBODIMENT(S)

Figure 1:
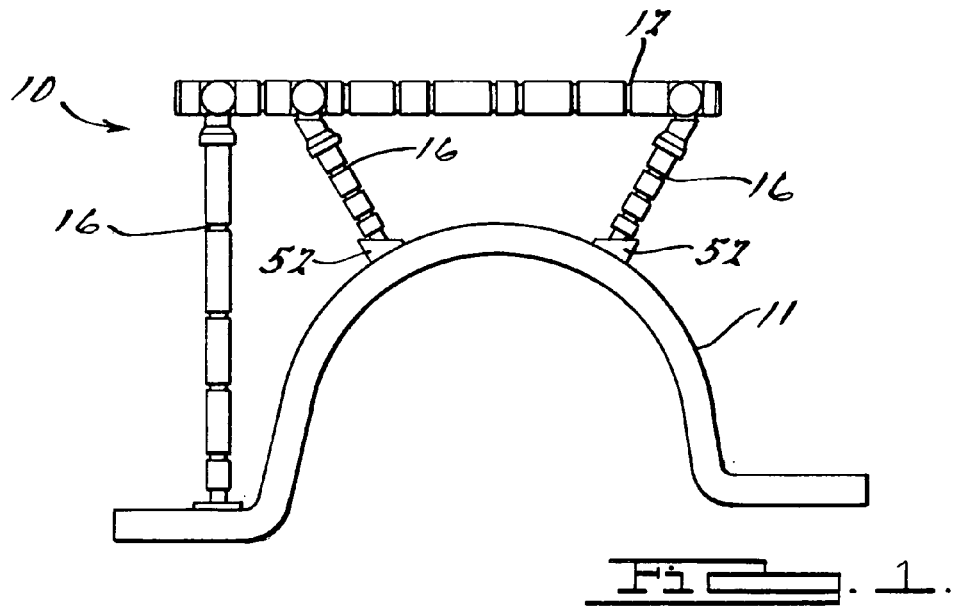
FIG. 1 is an elevational view of a manifold assembly, according to the present invention, illustrated in operational relationship with a mold for molding a wheel well liner.
Figure 2:
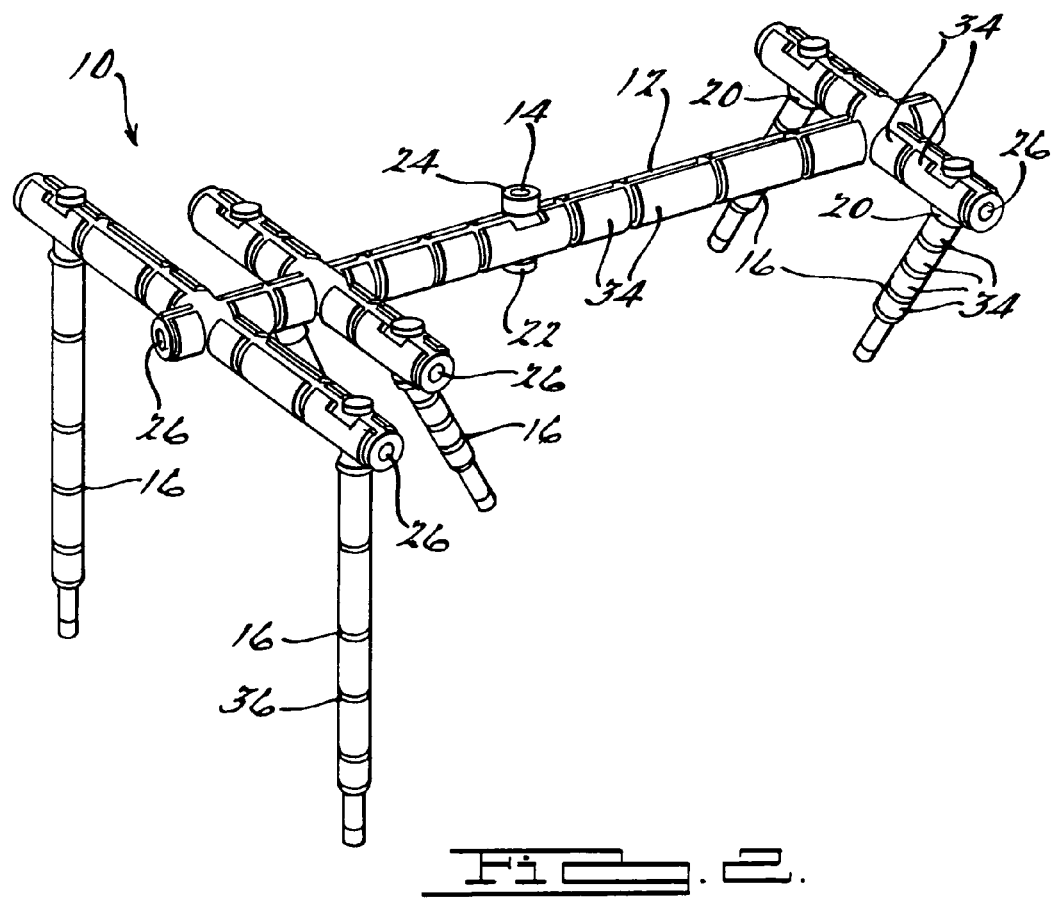
FIG. 2 is a perspective view of the manifold assembly of FIG. 1.

Referring to the drawings, and in particular FIGS. 1 and 2, one embodiment of a manifold assembly 10, according to the present invention, is shown. The manifold assembly 10 is used for conveying an injection molding material from a molding material supply such as an injection molding machine (not shown) into a mold 11 for molding an arcuate part such as a wheel well liner. The manifold assembly 10 includes an integral or one piece, cast or machined, cylindrical manifold 12 including a central flow passage 14 extending along the manifold 12 including each branch of the manifold 12 and at least one nozzle 16 extending outwardly from the manifold 12. Each nozzle 16 includes a central nozzle passage 18 extending from the manifold flow passage 14. Each nozzle 16 may be of varying length in order to conform to the various mold cavity dimensions, which may be required for a particular mold. The manifold 12 and/or the nozzles 16 may have a generally circular or rectangular cross-sectional shape. At least one of the nozzles 16 is orientated at an angle or incline to the manifold 12. For example, two of the nozzles 16 extend outwardly from the manifold 12 at an angle to be tangential to an arcuate portion of the part to be molded. It should be appreciated that the nozzles 16 for molding the arcuate portion of the part to be molded are not perpendicular or at ninety degrees (90°) to the manifold 12.

The manifold assembly 10 includes an insulator 20 such as a drop in the form of a stainless steel insulating ring disposed about each of the nozzles 16 for inhibiting the heat transfer between each nozzle 16 and a core or cavity for the mold 11. The manifold 12 is further insulated from mold 11 by at least one insulator such as a support block 22. The manifold assembly 10 also includes a stainless steel sprue 24 extending radially outward from the manifold 12 for facilitating the introduction of injection molding material into the manifold 12. It should be appreciated that the molten material may be of a plastic, metal, wood fibers and plastic, etc. and is injected into the sprue 24 of the manifold assembly 10 from a molding machine (not shown).

The manifold assembly 10 includes an insulator 26 disposed at the radiused terminal ends of each branch of the manifold 12 to facilitate relatively low heat transfer from the ends of the manifold 12 to the surrounding material. The insulator 26 is an aluminum plug defining the radiused terminal ends of the central flow passage 14 of the manifold 12. The insulator 26 has a curved end (not shown) that form the radiused ends within the central flow passage 14. It should be appreciated that the curved end reduces the amount of flow shear within the molten material, which may occur at these corners as the flow moves through a right turn from the manifold passage 14 to the adjacent nozzle passage 18.

The manifold assembly 10 includes stainless steel reaction members 28 removably secured radially opposite the nozzles 16 by fasteners such as a screw 30, or the like, and insulate the manifold 12 from a clamp plate 32. In addition, the stainless steel reaction members 28 are preload pads that react between the clamp plate 32 and the manifold 12, supporting the manifold 12 when it is under resulting pressures produced in the manifold 12 during the injection molding process.

The manifold assembly 10 also includes at least one, preferably a plurality of electrical heaters 34 in the form of heater bands removably disposed about the circumference of the manifold 12 as well as the nozzles 16 to supply heat to maintain the plastic at a specified or predetermined temperature. The heaters 34 are formed as two half cylinders electrically wired in parallel to an electrical source such as a junction box (not shown). The half cylinders of the heaters 34 are removably clamped about the circumference of the manifold 12 and nozzles 16 using conventional clamping fasteners or the like (not shown).

The manifold assembly 10 includes at least one, preferably a plurality of temperature-measuring sensors 36 for monitoring the temperature of the molten material. The sensors 36 are secured within the manifold 12 and nozzles 16 in sensor apertures or holes (not shown) bored through the manifold 12 and the nozzle 16 at points equidistant from the outer diameter of the flow passages 14, 18 and the outer diameter of the manifold 12 and nozzle 16. The temperature-measuring sensors 36 may be of a thermocouple type secured in the sensor apertures by set screws (not shown) positioned in threaded apertures (not shown) that are bored perpendicular to the longitudinal axis of the sensor apertures. The sensors 36 are electrically wired to a power source such as an electrical junction box (not shown) and include a stainless braided wire shield (not shown) that protect against radio frequency noise interference from the heaters electrical current wires (not shown) and thus insure accurate temperature readings.

The heaters 34 and sensors 36 are arranged and monitored in finite zones about the injection system. This multizonal control facilitates more accurate monitoring and control of the temperature of the molten material throughout the injection process resulting in less heat loss and better molds.

The manifold assembly 10 includes a nozzle bushing 38 at the end of each of the nozzles 16. The nozzle bushing 38 has a bushing passage 40 extending therethrough and terminating in a gate 42. The bushing passage 40 fluidly communicates with the nozzle passage 18. The nozzle bushing 38 is made of a metal material. The nozzle bushing 38 is a monolithic structure being integral, unitary, and one-piece.

The manifold assembly 10 also includes a sprue 44 disposed over the nozzle bushing 38. The sprue 44 has a cavity 46 for receiving a lower end of the nozzle bushing 38. The sprue 44 has an aperture or opening 48 extending axially through the lower end thereof and fluidly communicating with the cavity 46. The sprue 44 also has an upper threaded portion 50 threadably engaging the end of the nozzle 16 to secure the nozzle bushing 38 to the nozzle 16. The sprue 44 is made of a metal material. The sprue 44 is a monolithic structure being integral, unitary, and one-piece.

The manifold assembly 10 further includes at least one, preferably a plurality of drop locators 52. The drop locators 52 are in the form of a stainless steel insulating ring disposed about each of the sprues 44 for locating the sprue 44 relative to the mold 11 and inhibiting the heat transfer between each sprue 44 and a core or cavity for the mold 11. The drop locator 52 has an aperture 54 extending axially therethrough to receive the sprue 44. The drop locator 52 is made of a metal material. The drop locator 52 is a monolithic structure being integral, unitary, and one-piece.

In operation, molten material is injected at high temperatures and pressures into the manifold 12 through the sprue 20. The molten material then flows along the central flow passage 14 of the manifold 12 to the nozzles 16. The molten material then flows through the nozzle passages 18, bushing passages 40, gates 42, and openings 48 to the mold 11 to mold a part 58 having an arcuate portion 60 such as a wheel well liner. In the embodiment illustrated, four of the nozzles 16 are orientated at an angle to be tangential to the arcuate portion 60. It should be appreciated that throughout the injection process, the heaters 34 maintain the molten material at a specified temperature, which is monitored by the sensors 36.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A manifold assembly for conveying injection molding material from a molding material supply into a mold, said manifold assembly comprising:

a manifold including a manifold flow passage extending therealong, said manifold having a receiving flow passage communicating with said manifold flow passage for receiving molding material from the molding material supply and at least one exiting flow passage communicating with said manifold flow passage for exiting a portion of said manifold, said manifold having at least one manifold surface being generally planar, said at least one exiting flow passage communicating with said at least one manifold surface;

at least one nozzle having a proximal end adjacent said at least one manifold surface of said manifold and extending outwardly from said proximal end to a distal end, said proximal end having a nozzle surface inclined relative to an axially extending axis of said at least one nozzle and mating with said at least one manifold surface, said at least one nozzle including a central nozzle passage extending from and in fluid communication with said at least one exiting flow passage; and said at least one nozzle extending on an angle from said manifold at said proximal end such that said distal end is tangential to an arcuate surface of a part to be molded.

2. A manifold assembly as set forth in claim 1 including drop locator adapted to be located on an arcuate portion of the mold to receive said distal end of said at least one nozzle.

3. A manifold assembly as set forth in claim 1 including at least one heater disposed about said at least one nozzle.

4. A manifold assembly as set forth in claim 1 including a nozzle bushing located at the distal end of said at least one nozzle.

5. A manifold assembly as set forth in claim 4 wherein said nozzle bushing has a bushing passage fluidly communicating with said nozzle passage.

6. A manifold assembly as set forth in claim 5 wherein said nozzle bushing has a gate at one end of said bushing passage.

7. A manifold assembly as set forth in claim 4 including a sprue disposed over said nozzle bushing and connected to said at least one nozzle.

8. A manifold assembly as set forth in claim 1 including an insulator disposed about said at least one nozzle near said proximal end thereof.

9. A manifold assembly as set forth in claim 1 including a plurality of nozzles extending on an angle from said manifold and adapted to be located tangential to the arcuate surface of the part to be molded.

10. A manifold assembly as set forth in claim 9 including a plurality of drop locators adapted to be located on the arcuate portion of the mold, each of said drop locators receiving said distal end of one of said nozzles.

11. A manifold assembly for conveying injection molding material from a molding material supply into a mold, said manifold assembly comprising:

a manifold including a manifold flow passage extending therealong, said manifold having a receiving flow passage communicating with said manifold flow passage for receiving molding material from the molding material supply and a plurality of exiting flow passages communicating with said manifold flow passage for exiting a portion of said manifold, said manifold having a plurality of generally planar manifold surfaces, one of said exiting flow passages communicating with a corresponding one of said manifold surfaces;

a plurality of nozzles extending outwardly from said manifold, each of said nozzles having a proximal end adjacent the portion of said manifold, at least one of said nozzles having a nozzle surface inclined relative to an axially extending axis of said nozzle and mating with one of said manifold surfaces, each said nozzles extending from said proximal end to a distal end, each of said nozzles including a central nozzle passage extending from and in fluid communication with a corresponding one of said exiting flow passages; and said at least one of said nozzles extending on an angle from said manifold at said proximal end such that said distal end is tangential to an arcuate surface of a part to be molded.

12. A manifold assembly as set forth in claim 11 including drop locator adapted to be located on an arcuate portion of the mold to receive said distal end of said at least one of said nozzles.

13. A manifold assembly as set forth in claim 11 including at least one heater disposed about said at least one of said nozzles.

14. A manifold assembly as set forth in claim 11 including a nozzle bushing located at the distal end of said at least one of said nozzles.

15. A manifold assembly as set forth in claim 14 wherein said nozzle bushing has a bushing passage fluidly communicating with said nozzle passage.

16. A manifold assembly as set forth in claim 15 wherein said nozzle bushing has a gate at one end of said bushing passage.

17. A manifold assembly as set forth in claim 14 including a sprue disposed over said nozzle bushing and connected to said at least one of said nozzles.

18. A manifold assembly as set forth in claim 11 including an insulator disposed about said at least one of said nozzles near said proximal end thereof.

* * * * *